United States Patent [19]

Zimmer et al.

[11] Patent Number: 4,564,337
[45] Date of Patent: Jan. 14, 1986

[54] AIRCRAFT PROPELLER

[75] Inventors: Herbert Zimmer, Friedrichshafen; Ingo Dathe, Immenstaad; Reinhard Hoffmann, Brannenburg; Petr Hora, Stephanskirchen; Franz X. Wortmann, Böblingen, all of Fed. Rep. of Germany

[73] Assignee: Dornier Gesellschaft mit besehränkter Haftung, Friedfrichshafen, Fed. Rep. of Germany

[21] Appl. No.: 540,493

[22] Filed: Oct. 11, 1983

[30] Foreign Application Priority Data

Oct. 9, 1982 [DE] Fed. Rep. of Germany ....... 3237518
Mar. 25, 1983 [DE] Fed. Rep. of Germany ....... 3310937

[51] Int. Cl.⁴ ............................................. B64C 11/18
[52] U.S. Cl. ................. 416/223 R; 416/242; 416/DIG. 2
[58] Field of Search ...... 416/223 R, DIG. 2, DIG. 5, 416/228 A, 234, 242; 244/35 R, 17.11

[56] References Cited

U.S. PATENT DOCUMENTS

| 1,460,230 | 6/1923 | De Monge | 416/223 |
| 2,441,758 | 5/1948 | Garbell | 416/DIG. 2 |
| 2,709,052 | 5/1955 | Berg | 244/35 R |
| 3,173,490 | 3/1965 | Stuart | 416/223 R |

FOREIGN PATENT DOCUMENTS 1079083 11/1954 France ........................... 416/242

Primary Examiner—Everette A. Powell, Jr.
Attorney, Agent, or Firm—Hammond & Littell, Weissenberger & Dippert

[57] ABSTRACT

An aircraft propeller blade comprising an inner section which extends from the propeller hub toward the blade tip, a middle section adjacent to said inner section, and an outer section which extends from adjacent to said middle section to the blade tip; where the largest camber in the inner section decreases linearly over the blade length from adjacent to the propeller hub toward the blade tip, and the greatest camber height location shifts linearly over the blade length toward the blade tip; the largest camber in the middle section increases linearly over the blade length toward the blade tip, and the greatest camber height location shifts approximately linearly from adjacent to the inner section toward the blade tip; and the camber in the outer section decreases elliptically over the blade length toward the blade tip, and the greatest camber height location remains constant from adjacent to the middle section to the blade tip.

5 Claims, 7 Drawing Figures

TABLE 1

$\frac{r}{R} = 0.22$ $\frac{t}{R} = 0.158$

| $\frac{x}{t}$ | $\frac{z_o}{t}$ | $\frac{z_u}{t}$ |
|---|---|---|
| 0.0 | 0.0046 | 0.0046 |
| 0.010 | 0.0494 | -0.0343 |
| 0.025 | 0.0771 | -0.0506 |
| 0.050 | 0.1091 | -0.0666 |
| 0.075 | 0.1343 | -0.0780 |
| 0.100 | 0.1549 | -0.0878 |
| 0.150 | 0.1860 | -0.1030 |
| 0.200 | 0.2067 | -0.1142 |
| 0.250 | 0.2191 | -0.1225 |
| 0.300 | 0.2238 | -0.1282 |
| 0.350 | 0.2209 | -0.1316 |
| 0.400 | 0.2109 | -0.1324 |
| 0.450 | 0.1966 | -0.1303 |
| 0.500 | 0.1806 | -0.1255 |
| 0.550 | 0.1641 | -0.1174 |
| 0.600 | 0.1470 | -0.1052 |
| 0.650 | 0.1296 | -0.0900 |
| 0.700 | 0.1122 | -0.0740 |
| 0.750 | 0.0953 | -0.0591 |
| 0.800 | 0.0787 | -0.0459 |
| 0.850 | 0.0624 | -0.0348 |
| 0.900 | 0.0463 | -0.0255 |
| 0.950 | 0.0305 | -0.0182 |
| 1.000 | 0.0150 | -0.0150 |

TABLE 2

$\frac{r}{R} = 0.366$ $\frac{t}{R} = 0.161$

| $\frac{x}{t}$ | $\frac{z_o}{t}$ | $\frac{z_u}{t}$ |
|---|---|---|
| 0.0 | 0.0016 | 0.0016 |
| 0.010 | 0.0185 | -0.0150 |
| 0.025 | 0.0326 | -0.0235 |
| 0.050 | 0.0497 | -0.0311 |
| 0.075 | 0.0632 | -0.0372 |
| 0.100 | 0.0743 | -0.0423 |
| 0.150 | 0.0919 | -0.0502 |
| 0.200 | 0.1050 | -0.0560 |
| 0.250 | 0.1144 | -0.0603 |
| 0.300 | 0.1207 | -0.0634 |
| 0.350 | 0.1242 | -0.0653 |
| 0.400 | 0.1252 | -0.0658 |
| 0.450 | 0.1239 | -0.0650 |
| 0.500 | 0.1199 | -0.0626 |
| 0.550 | 0.1130 | -0.0588 |
| 0.600 | 0.1035 | -0.0531 |
| 0.650 | 0.0917 | -0.0455 |
| 0.700 | 0.0784 | -0.0376 |
| 0.750 | 0.0651 | -0.0300 |
| 0.800 | 0.0521 | -0.0232 |
| 0.850 | 0.0390 | -0.0175 |
| 0.900 | 0.0256 | -0.0130 |
| 0.950 | 0.0120 | -0.0095 |
| 1.000 | -0.0017 | -0.0085 |

TABLE 3

$\frac{r}{R} = 0.513$ $\frac{t}{R} = 0.164$

| $\frac{x}{t}$ | $\frac{z_o}{t}$ | $\frac{z_u}{t}$ |
|---|---|---|
| 0.0 | 0.0051 | 0.0051 |
| 0.010 | 0.0219 | -0.0113 |
| 0.025 | 0.0353 | -0.0184 |
| 0.050 | 0.0492 | -0.0229 |
| 0.075 | 0.0587 | -0.0265 |
| 0.100 | 0.0664 | -0.0295 |
| 0.150 | 0.0783 | -0.0332 |
| 0.200 | 0.0869 | -0.0358 |
| 0.250 | 0.0932 | -0.0374 |
| 0.300 | 0.0974 | -0.0383 |
| 0.350 | 0.0996 | -0.0385 |
| 0.400 | 0.0999 | -0.0382 |
| 0.450 | 0.0982 | -0.0371 |
| 0.500 | 0.0947 | -0.0352 |
| 0.550 | 0.0895 | -0.0318 |
| 0.600 | 0.0827 | -0.0271 |
| 0.650 | 0.0744 | -0.0218 |
| 0.700 | 0.0648 | -0.0168 |
| 0.750 | 0.0538 | -0.0128 |
| 0.800 | 0.0424 | -0.0101 |
| 0.850 | 0.0307 | -0.0088 |
| 0.900 | 0.0190 | -0.0088 |
| 0.950 | 0.0080 | -0.0103 |
| 1.000 | -0.0029 | -0.0129 |

TABLE 4

$\frac{r}{R} = 0.659$ $\frac{t}{R} = 0.167$

| $\frac{x}{t}$ | $\frac{z_o}{t}$ | $\frac{z_u}{t}$ |
|---|---|---|
| 0.0 | 0.0046 | 0.0046 |
| 0.010 | 0.0214 | -0.0117 |
| 0.025 | 0.0334 | -0.0185 |
| 0.050 | 0.0446 | -0.0221 |
| 0.075 | 0.0519 | -0.0244 |
| 0.100 | 0.0574 | -0.0257 |
| 0.150 | 0.0659 | -0.0258 |
| 0.200 | 0.0719 | -0.0245 |
| 0.250 | 0.0763 | -0.0224 |
| 0.300 | 0.0794 | -0.0198 |
| 0.350 | 0.0814 | -0.0170 |
| 0.400 | 0.0823 | -0.0142 |
| 0.450 | 0.0821 | -0.0114 |
| 0.500 | 0.0807 | -0.0088 |
| 0.550 | 0.0783 | -0.0062 |
| 0.600 | 0.0747 | -0.0036 |
| 0.650 | 0.0699 | -0.0013 |
| 0.700 | 0.0637 | 0.0001 |
| 0.750 | 0.0554 | 0.0006 |
| 0.800 | 0.0455 | 0.0 |
| 0.850 | 0.0340 | -0.0016 |
| 0.900 | 0.0216 | -0.0039 |
| 0.950 | 0.0103 | -0.0074 |
| 1.000 | -0.0017 | -0.0115 |

TABLE 5

| $\frac{r}{R}$ = 0,806 | | |
|---|---|---|
| $\frac{t}{R}$ = 0,164 | | |
| $\frac{x}{t}$ | $\frac{z_o}{t}$ | $\frac{z_u}{t}$ |
| 0.0 | 0.0038 | 0.0038 |
| 0.010 | 0.0167 | -0.0090 |
| 0.025 | 0.0265 | -0.0145 |
| 0.050 | 0.0354 | -0.0177 |
| 0.075 | 0.0415 | -0.0194 |
| 0.100 | 0.0462 | -0.0203 |
| 0.150 | 0.0531 | -0.0198 |
| 0.200 | 0.0582 | -0.0179 |
| 0.250 | 0.0618 | -0.0152 |
| 0.300 | 0.0643 | -0.0122 |
| 0.350 | 0.0659 | -0.0091 |
| 0.400 | 0.0666 | -0.0062 |
| 0.450 | 0.0666 | -0.0035 |
| 0.500 | 0.0658 | -0.0012 |
| 0.550 | 0.0641 | 0.0007 |
| 0.600 | 0.0617 | 0.0021 |
| 0.650 | 0.0583 | 0.0029 |
| 0.700 | 0.0537 | 0.0032 |
| 0.750 | 0.0475 | 0.0028 |
| 0.800 | 0.0398 | 0.0018 |
| 0.850 | 0.0305 | 0.0001 |
| 0.900 | 0.0203 | -0.0025 |
| 0.950 | 0.0103 | -0.0057 |
| 1.000 | -0.0000 | -0.0100 |

TABLE 6

| $\frac{r}{R}$ = 0,952 | | |
|---|---|---|
| $\frac{t}{R}$ = 0,096 | | |
| $\frac{x}{t}$ | $\frac{z_o}{t}$ | $\frac{z_u}{t}$ |
| 0.0 | 0.0030 | 0.0030 |
| 0.010 | 0.0120 | -0.0064 |
| 0.025 | 0.0194 | -0.0106 |
| 0.050 | 0.0259 | -0.0136 |
| 0.075 | 0.0303 | -0.0150 |
| 0.100 | 0.0339 | -0.0157 |
| 0.150 | 0.0390 | -0.0151 |
| 0.200 | 0.0427 | -0.0132 |
| 0.250 | 0.0454 | -0.0108 |
| 0.300 | 0.0472 | -0.0081 |
| 0.350 | 0.0483 | -0.0054 |
| 0.400 | 0.0488 | -0.0028 |
| 0.450 | 0.0488 | -0.0006 |
| 0.500 | 0.0481 | 0.0013 |
| 0.550 | 0.0468 | 0.0028 |
| 0.600 | 0.0450 | 0.0037 |
| 0.650 | 0.0424 | 0.0041 |
| 0.700 | 0.0390 | 0.0039 |
| 0.750 | 0.0345 | 0.0032 |
| 0.800 | 0.0288 | 0.0018 |
| 0.850 | 0.0221 | -0.0002 |
| 0.900 | 0.0149 | -0.0027 |
| 0.950 | 0.0075 | -0.0060 |
| 1.000 | 0.0 | -0.0100 |

4,564,337

AIRCRAFT PROPELLER

This invention relates to a novel thrust-producing device, particularly for the propulsion of aircraft, such as a propeller or the like.

BACKGROUND OF THE INVENTION

In the past, in order to improve the performance of general aviation aircraft, considerable effort has been exerted in the field of airframe design, particularly in the area of wing design, from which substantial performance improvements have resulted.

On the other hand, for propellers or air screws, the main task of which is to transform the power supplied by the engine into propulsion, one has not learned of any very successful activities. The output of propellers has in the past been improved only insignificantly, although this type of drive has a thrust potential that could be utilized much more.

Propellers now in use achieve, as they have done unchanged for a long time, only about 50 to 70% on the ground and about 90% when cruising, of the propeller thrust values maximally possible according to the impulse theory.

OBJECTS OF THE INVENTION

It is an object of the present invention to improve the propeller thrust output by aerodynamic means, while the propeller diameter, power, and number of revolutions remain the same, and at the same time, in high-speed flight there is no loss of power and the sound radiation is reduced.

Other objects and advantages of the invention will become apparent as the description thereof proceeds.

DESCRIPTION OF THE INVENTION

The above object is achieved in accordance with the present invention in that, over their length or propeller radius, the propeller blades comprise three sections of equal or substantially equal length, where the greatest camber which extends in the inner section, including the hub region, linearly or substantially linearly decreases over the blade length toward the blade tip, and the location of the greatest camber, referred to the blade depth, shifts linearly or substantially linearly toward the trailing edge of the blade; the greatest camber which extends in the middle section increases linearly or substantially linearly over the length of the blade, and the location of the greatest camber shifts toward the trailing edge of the blade and follows the course of the inner section, referred to the blade depth, linearly or substantially linearly; and the greatest camber which extends in the outer section decreases elliptically or substantially elliptically over the length of the blade, and the location of the greatest camber, referred to the blade depth following the middle section, remains constant or substantially constant.

With the design of the propeller blades according to the invention, in conjunction with the propeller hub, a substantial thrust improvement is achieved, especially during take-off and climbing. During take-off this leads to a substantial shortening of the take-off distance, which results in a considerable reduction of the noise pollution of residences near airports. Further, with the thrust improvement for twin-engine airplanes, additionally an increase of the take-off weight limited by the single-engine climbing power is brought about. From this results an increase of the payload and/or the range of this aircraft category, and hence an improvement of the economic efficiency. By virtue of the shortened take-off distance and the greater range, the area of use of airplanes is further expanded.

Additional advantages, features or forms of realization of the invention will become evident from the attached drawings and the respective embodiment description. In the drawings, FIG. 1 shows, in a diagram, the propeller thrust as a function of the flying speed of a number of prior propeller designs in comparison with the theoretical thrust limit;

FIG. 3 shows, in a diagram, the response of the blade depth over the blade length of the design according to FIG. 2 or FIG. 2a;

Figure 1:
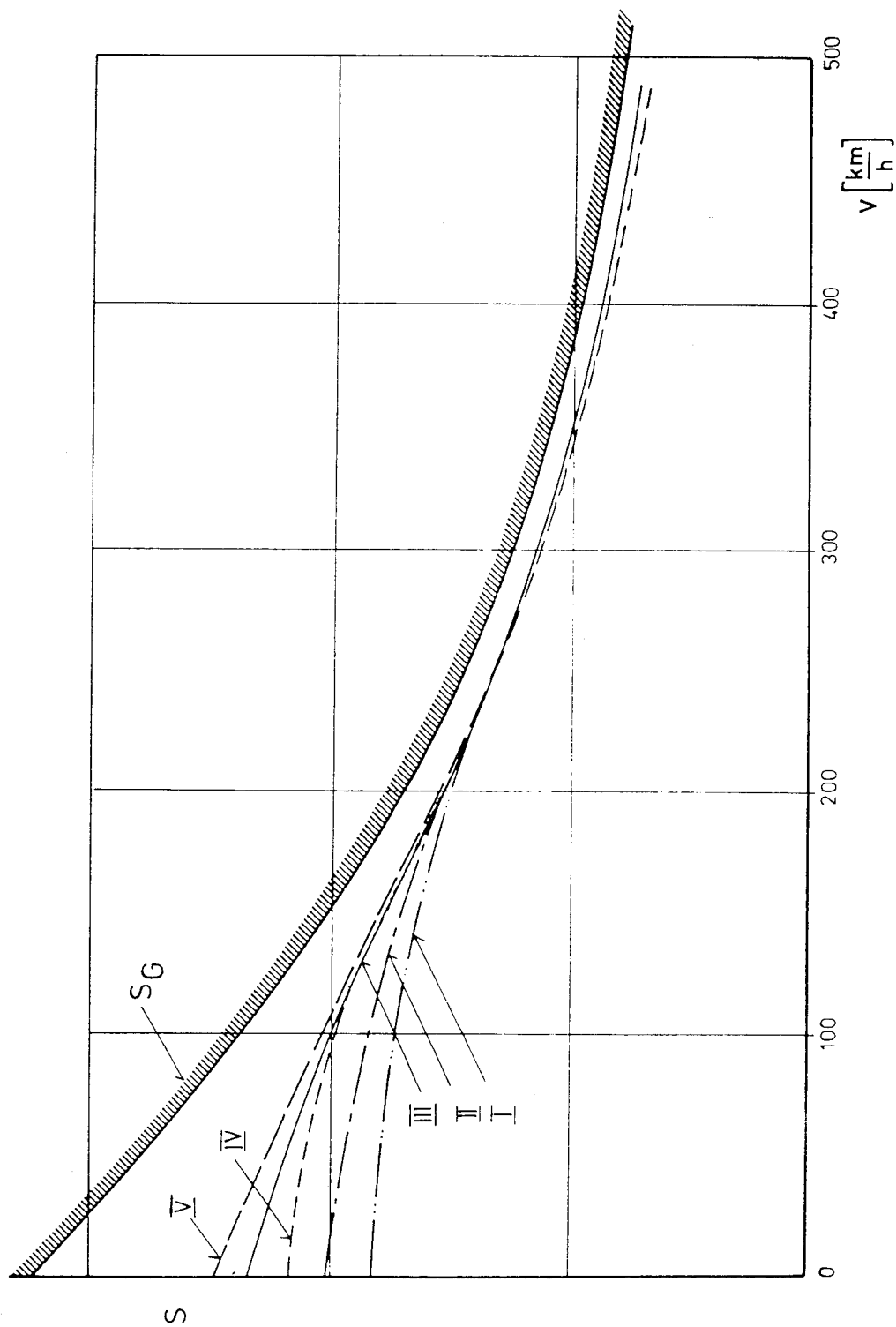

In the rectangular plane coordinate system shown in FIG. 1, the flying speed V (km/h) is plotted on the abscissa, and the propeller thrust S on the ordinate. The characteristic lines I, II, III, IV and V resulting from the dependence of the propeller thrust S on the flying speed V (km/h) are based on values of known propeller designs.

Further, $S_G$ of the diagram denotes the characteristic line of the theoretical thrust limit according to the impulse theory. It can be seen from the comparison shown that with the prior propeller designs one can achieve thrust values only in the order of between about 50 and 70% at standstill and in cruising of approximately 90% of the thrust values maximally possible according to the impulse theory. The comparison according to FIG. 1 assumes constant power and rpm, and a propeller with three and four propeller blades, respectively.

Figure 2:
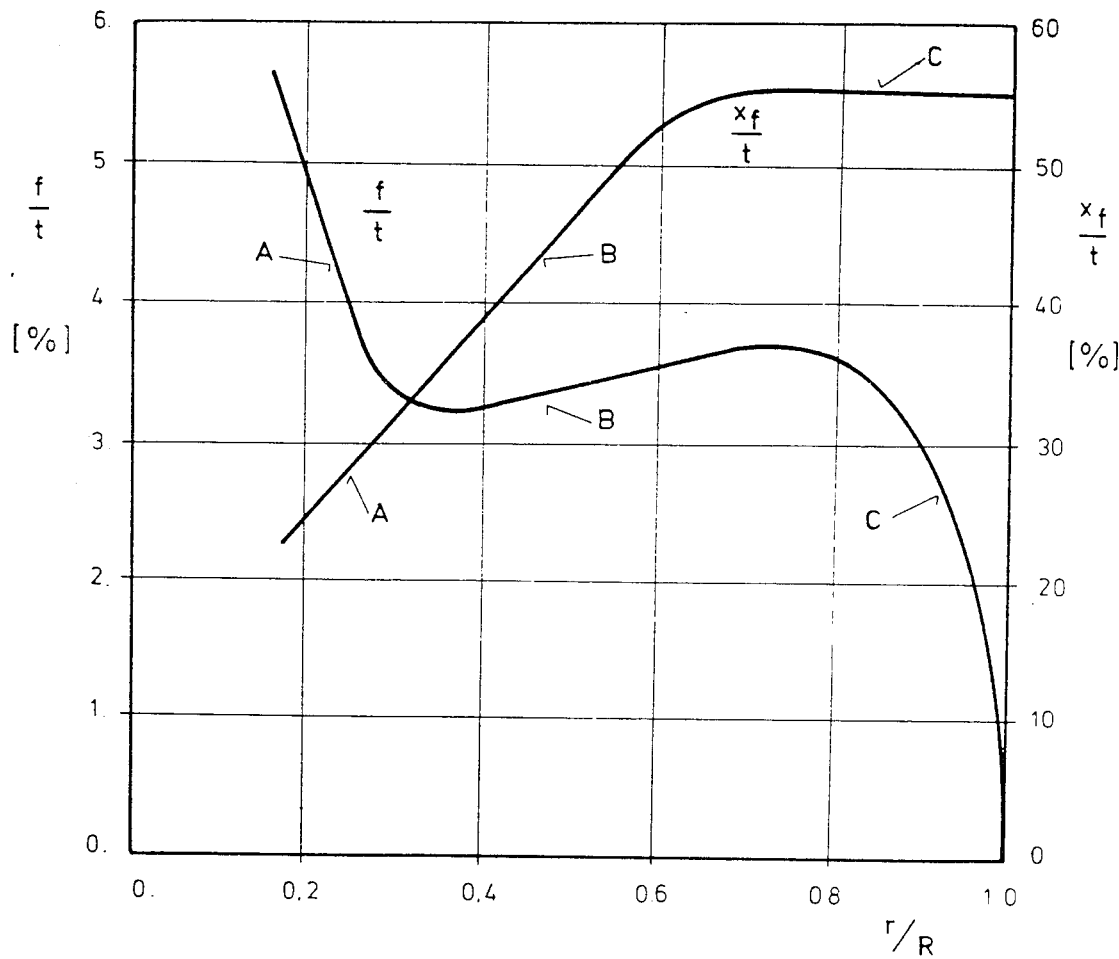
FIG. 2 shows, in a diagram, the response of the greatest camber as a function of the location of the greatest camber relative to the lengthwise extent of the blade, according to the design of the invention.
Figure 2A:
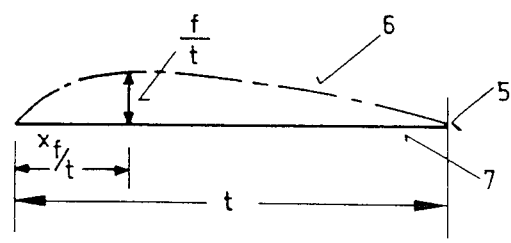
FIG. 2a shows, in schematic form, dimensional data for a propeller blade in a blade cross-section according to the diagram of FIG. 2.
Figure 2B:
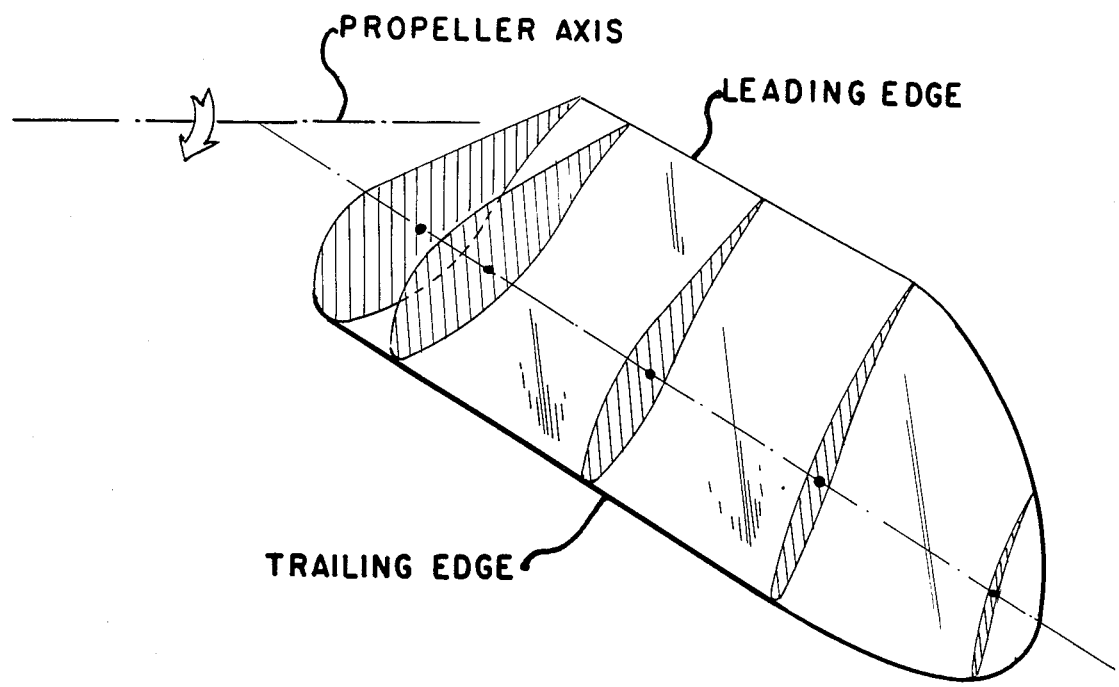
FIG. 2b is a perspective representation of the propeller blade according to the present invention showing multiple cross sections over the blade length.
Figure 3:
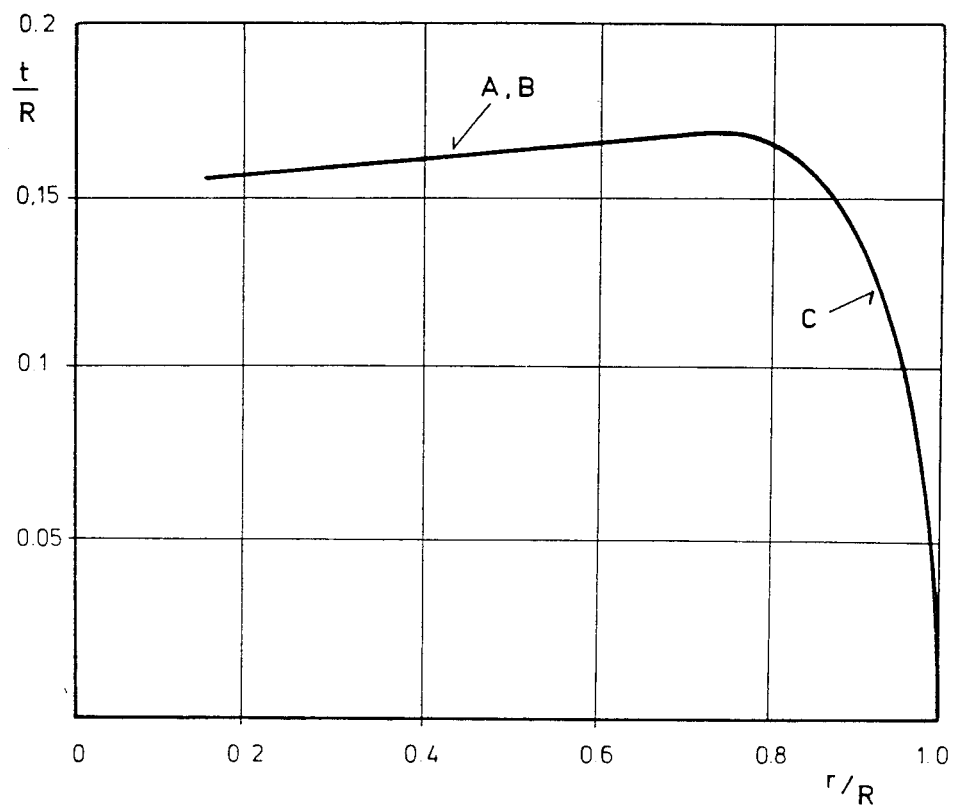

FIGS. 2 and 3 show with the aid of coordinate systems the design of propeller blades according to the invention. In the coordinate system of FIG. 2 the greatest camber f/t is plotted on one ordinate, on the second ordinate the location of the greatest camber $x_f/t$ (in per cent) is plotted, and on the abscissa the blade length r/R is plotted, where r denotes the local radius, referred to the propeller radius R, f is the maximum value of the local mean chamber line. Further, f/t and $x_f/t$ denote the characteristic of the greatest camber or location of greatest camber referred to the propeller blade depth t (FIG. 2a). According to the course of the characteristic for the greatest camber f/t, the propeller blade comprises three different sections A, B, C of approximately equal length in the direction of the blade length r/R.

FIG. 2a indicates with respect to the diagram of FIG. 2 dimensional explanations for the greatest camber f/t and the location of the respective greatest camber $x_f/t$, referred to the propeller blade depth t in the transverse section of a blade. The mean camber line 6 of the propeller blade is shown in dash-dot lines in connection with the propeller blade depth t. Further, the chord line of the blade is marked 7. The camber f/t is indicated by the greatest distance between the blade chord 7 and the mean camber line 6 (FIG. 2a).

Inside the inner section A, which includes the blade root region, and which has a length of $r/R=0.17\pm0.05$ to $0.35\pm0.05$, corresponding to $17\%\pm5\%$ to $33\%\pm5\%$ of the radius R, the propeller blade has its greatest thickness, because of the greatest stress. The profiling extends up to the propeller hub 3, to avoid the formation of an additional resistance. The profiling in this region (propeller hub) is further of importance for utilizing the Coriolis acceleration. By this measure the usable lift, that is, the usable thrust S of the inner section A, is intensified, because with Coriolis acceleration a suction effect on the boundary layer material is brought about.

According to FIG. 2, in section A the greatest camber decreases from about $5.6\%\pm0.3\%$ to $3.2\%\pm0.3\%$ over the blade length r/R. At the same time, the location of the maximum camber $x_f/t$ changes over the blade length r/R starting from the hub 3 (FIG. 3a) toward the trailing edge 5 of the blade linearly from $20\%\pm5\%$ to $35\%\pm5\%$. The middle section B, which includes a region along the blade length of $r/R=0.35\pm0.05$ to $0.7\pm0.05$, corresponding to $35\%\pm5\%$ to $70\%\pm5\%$ of the radius R, creates a large part of the thrust. Within this section B, according to the characteristic line f/t of FIG. 2, the greatest camber f/t increases linearly from $3.2\%\pm0.3\%$ to $3.7\%\pm0.3\%$. The location of the greatest camber $x_f/t$ also changes over the blade length r/R in the direction of the trailing edge 5 linearly from $35\%\pm5\%$ to $55\%\pm5\%$ of the propeller blade depth t.

Lastly, the outer section C, which extends in the direction of the blade length r/R from $0.7\pm0.05$ to 1.0 corresponding to 70% to $\pm100\%$ of the radius R, is characterized in that, according to the characteristic line f/t, the greatest camber f/t decreases approximately elliptically from $3.7\%\pm0.3\%$ to zero, and that, further, the location of the greatest camber $x_f/t$ remains constant at $55\%\pm5\%$ of the blade depth t.

Figure 3A:
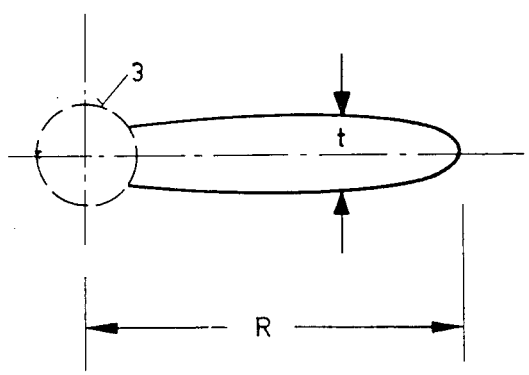
FIG. 3a shows, in schematic form, a propeller blade according to FIGS. 2 or 2a in a plan view indicating the layout proportions with respect to the response of the blade depth over, the blade length according to FIG. 3.

In FIGS. 3 and 3a, the course of the characteristic line t/R of the blade depth distribution is shown for the described preferred embodiment. On the ordinate of the diagram is plotted the blade-depth ratio t/R, and on the abscissa the blade length r/R. By t is designated the propeller blade depth, by 3 the propeller hub, and by R the propeller radius, according to the blade length.

According to FIGS. 3 and 3a, in accordance with the characteristic curve, the blade depth distribution increases in the region of section A which includes the blade root and in the middle section B linearly from $15\%\pm3\%$ to $17\%\pm3\%$, and within the blade section C it decreases from $17\%\pm3\%$ of the radius R towards the blade tip approximately elliptically to the value zero. The blade twist is then optimized in known manner according to the design velocity V of the aircraft.

As can be seen from Tables 1 to 6, the blade profiles are indicated in dimensionless representation in six profile sections over the sections A, B and C, r/R denoting the dimensionless location of the definition profiles in radial direction and r/R the dimensionless blade depth according to the data given in FIG. 3. Further, x/t is the dimensionless abscissa, $z_o/t$ are the profile upper surface coordinates belonging to x/t, and $z_u/t$ are the profile lower surface coordinates belonging to x/t. All values have been made dimensionless with the aid of the profiles depth t.

By virtue of the blade definition according to FIGS. 2 and 3, a more uniform downwash velocity distribution is achieved than with prior propeller designs. Low overvelocities at a given thrust lead to a higher propulsion efficiency and also to a reduction of noise.

Figure 4:
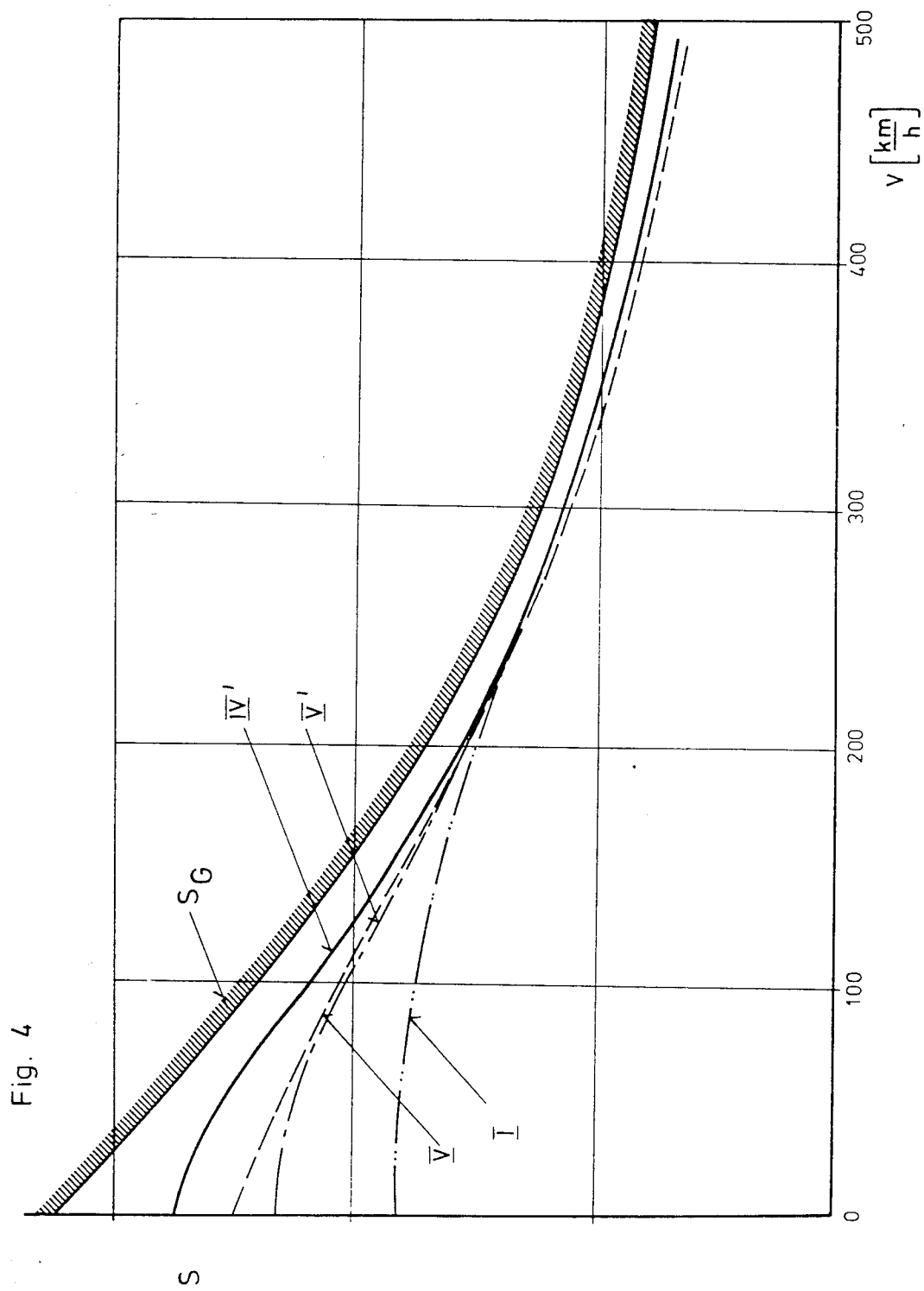
FIG. 4 shows, in a diagram, the dependence of the propeller thrust on the flying speed in a comparison of the propeller design of the invention with a number of prior designs (FIG. 1); and Tables 1 to 6 show profile coordinates on blade definition sections.

In the diagram of FIG. 4, the thrust response, confirmed by measurements, of a propeller designed according to the realization of FIGS. 2 and 3 has been compared with the thrust responses of known propeller designs (see FIG. 1).

The numerals I and V designate characteristics of known propeller designs according to FIG. 1, and the numerals IV' and V' designate characteristics of the propeller design according to the invention. In addition, here also the theoretical thrust limit is designated by $S_G$, the thrust by S, and the velocity by V. The four-blade design of a propeller designed according to the invention (bold continuous line IV') is superior to known propeller designs especially in the take-off and climbing ranges. Also, in the high-speed range an improvement is achieved.

The three-blade propeller according to the invention, in the design according to FIGS. 2 and 3 (dash-dot line V'), may be regarded as to its performance as approximately equivalent to a conventionally designed four-blade propeller but has the advantage over it of the lower weight because of the smaller number of blades.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. An aircraft propeller blade having a varying profile camber over its length or propeller radius (r/R), said propeller blade comprises three section (A, B, C) of equal or substantially equal length, where the maximum of the camber line (f/t) which extends in the inner section (A), including the hub region, decreases linearly or substantially linearly over the blade length (r/R) towards the blade tip, and the chordwise location of the maximum of the camber line ($x_f/t$), referred to the blade chord length (t), shifts linearly or substantially linearly towards the trailing edge (5) of the blade; the maximum of the camber line (f/t) which extends in the middle section (B) increases linearly or substantially linearly over the length of the blade (r/R), and the chordwise location of the maximum of the camber line ($x_f/t$) shifts towards the trailing edge of the blade and follows the course of the inner section (A), referred to the blade chord length (t), linearly or substantially linearly; and the maximum of the camber line (f/t) which extends in the outer section (C) decreases elliptically or substantially elliptically over the length of the blade (r/R), and the chordwise location of the maximum of the camber line ($x_f/t$) referred to the blade chord length (t) following the middle section (B), remains constant or substantially constant.

2. An aircraft propeller blade of claim 1, where within said inner section (A) and said middle section (B) the distribution of the blade chord length (t/R) increases approximately linearly over the blade length (r/R) and decreases approximately elliptically to the value zero in said outer section (C).

3. An aircraft propeller blade of claim 1, where
   (a) in section (A) the maximum of the camber line (f/t) which extends over the blade length (r/R)=0.17±0.05 to 0.35±0.05, corresponding to 17%±5% to 35%±5% of the radius (R), decreases linearly from 5.6%±0.3% to 3.2%±0.3% and the chordwise location of the maximum of the camber line ($x_f/t$) shifts towards the trailing edge (5) of the blade linearly from 20%±5% to 35%±5%;
   (b) in section (B) the maximum of the camber line (f/t) which extends over the blade length (r/R)=0.35±0.05 to 0.7±0.05 corresponding to 35%±5% to 70%±5% of the radius (R), increases linearly from 3.2%±0.3% to 3.7%±0.3%, and the chordwise location of the maximum of the camber line ($x_f/f$) shifts linearly towards the trailing edge (5) of the blade from 35%±5% to 55%±5%; and
   (c) in section (C) the maximum of the camber line (f/t) which extends over the blade length (r/R)=0.7±0.05 to 1.0, corresponding to 70%±5% to 100% of the radius (R), decreases approximately elliptically from 3.7%±0.3% to the value zero and the chordwise location of the maximum of the camber line ($x_f/t$) is constant at 55%±5%.

4. An aircraft propeller blade of claim 2, where in inner section (A) and middle section (B) the distribution of the blade chord length (t/R) over the blade length (r/R) increases linearly from 15%±3% to 17%±3% and decreases approximately elliptically in the outer section (C) from about 17%±3% to the value zero.

5. An aircraft propeller blade of claim 1, where the blade profiling (f/t; $x_f/t$) in the inner section (A) encloses the region of the blade root up to the propeller hub.

* * * * *